UNITED STATES PATENT OFFICE.

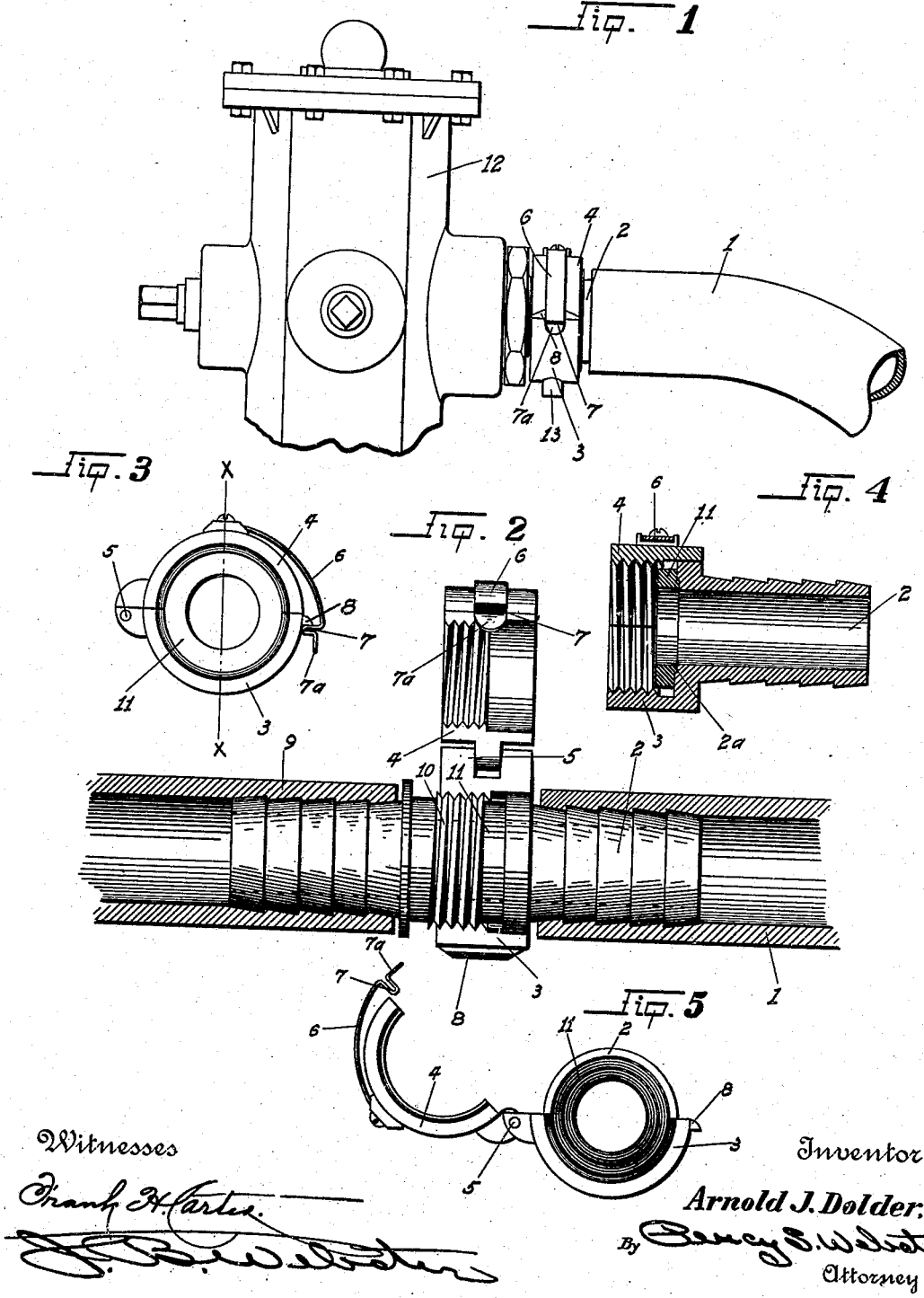

ARNOLD J. DOLDER, OF SAN FRANCISCO, CALIFORNIA.

HOSE-COUPLING.

937,364.  Specification of Letters Patent.  Patented Oct. 19, 1909.

Application filed October 30, 1907. Serial No. 399,927.

*To all whom it may concern:*

Be it known that I, ARNOLD J. DOLDER, a citizen of the United States, residing at San Francisco, in the county of San Francisco and State of California, have invented certain new and useful Improvements in Hose-Couplings; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in hose and hydrant couplings, my object being to produce such a coupling as will be easily and effectually handled, and one which will not stick or rust fast as is now so often the case. Also one which may be coupled and uncoupled in a rapid and effective manner and with a great saving of time over the present form of couplings. Also a coupling which is simple and inexpensive and adaptable for use on fire hydrants, watering hydrants and all manner of hose. This object I accomplish by means of a two piece female member suitably hinged together and having a spring clamping and locking member whereby said female coupling may be securely clamped onto the male coupling as will be shown; also by such other and further construction as will appear by a perusal of the following specification and claims.

In the drawings similar characters of reference indicate corresponding parts in the several views.

Figure 1 is a fragmentary side view of a fire hydrant shown with my improved coupling installed thereon. Fig. 2 is a sectional view of a hose with my improved coupling installed thereon. Fig. 3 is an end elevation of my improved coupling. Fig. 4 is a sectional view taken on a line $x$ $x$ of Fig. 3. Fig. 5 is an end elevation of my improved female coupling showing the parts open.

Referring more particularly to the characters of reference on the drawings 1 designates a hose in which is inserted the neck 2 of a female coupling, which female coupling is composed of two members 3 and 4, the member 3 being formed as a part of the member 2, while 4 is hinged to said member 3 by a pivotal hinge 5. Secured to the member 4 is a band spring 6 provided with a clip 7 adapted to engage with a lug 8 on the member 3 thus locking said member 4 to said member 3 when desired, as will appear. Said clip 7 is provided with a finger member 7ª whereby the said clip may be locked and unlocked.

9 is a hose in which is suitably secured a male coupling member 10.

In practice the threads on the member 10 are brought into register with the threads in the member 3 when the member 4 is open. Said member 4 is then closed over the member 3 and clamped thereon by means of the members 6, 7, 7ª and 8. The member 10 may then be screwed up as tight as desired, there being a washer 11 disposed intermediate the end of the member 10 and the top of the neck 2, said washer also fitting into a recess 2ª in the top of said member 2, thereby making a water tight joint. To uncouple the member 10 from the members 3 and 4 the operator grasps the finger piece 7ª and unclamps the clip 7 from the lug 8 and swings the member 4 open, thus permitting the member 10 to be easily removed. This operation of coupling and uncoupling the device by means of my improved construction is an exceedingly large advantage over the method of merely screwing the two together in that in this old method the parts rust or stick and it is almost impossible to unscrew them again, while with my device when the member 4 is turned back it is an easy matter to remove the member 10. Further a great saving of time and bother is occasioned by the use of my device, which is a great advantage, especially when used in connection with fire hydrants where haste is usually required.

Fig. 1 shows the coupling as used in connection with a fire hydrant, in which connection the member 3 may be provided with a lug 13 on which the wrench or spanner used to open the hydrant may be connected for the purpose of tightening the coupling.

Thus it will be seen that I have produced such a hose coupling as substantially fulfils all the objects of the invention as set forth herein.

While this specification sets forth in detail the present and preferred embodiment of my invention, still in practice such deviations from such detail as fall within the scope of my claims, may be resorted to without departing from the spirit of my invention.

Having thus described my invention, what

I claim as new and desire to secure by Letters Patent is:—

1. A hose coupling comprising the combination of a female coupling having a neck, such coupling comprising two members, one of such members being formed as a rigid part of said neck, two lugs spaced apart on one edge of said rigid member, a lug on said other member hinged between said two spaced lugs, a lug on the other edge of said rigid member, a band spring secured to, but spaced from, the outer periphery of said hinged member and having a clip member to engage said last named lug, and a male coupling adapted to be engaged between said two members of the female coupling.

2. A hose coupling comprising the combination of a female coupling having a neck, said coupling comprising two members, one being formed as a fixed component part of said neck, projecting lugs on said fixed member and spaced apart, the other member of said female coupling having a projecting lug pivoted between said first named lugs, a lug on the outer edge of said rigid member, a band spring secured at a spaced distance from said hinged member and following the contour thereof for a considerable distance and then projecting beyond the edge, a clip member on said spring comprising a downwardly projecting loop, a finger member projecting outward from the upper end of said loop, and a male coupling engageable in said female coupling as set forth.

3. A hose coupling comprising in combination a neck having a component projecting half coupling thereon, said neck and half coupling being orificed, the orifice of said half coupling being of a greater width than said orifice in said neck, a recess in the bottom of said coupling surrounding the orifice in said neck, two lugs on said coupling spaced apart, a half coupling having a lug pivoted between said two lugs, such second named half coupling operating to coincide with said first named coupling to form a complete coupling, a lug on said second named half coupling having projecting side flanges, a band spring secured between said flanges and curving upwardly and outwardly therefrom, a lug extending clear across the surface of said first half member, such spring having a clip member adapted to engage said lug.

In testimony whereof I affix my signature in presence of two witnesses.

ARNOLD J. DOLDER.

Witnesses:
L. F. DOLDER,
P. E. OTEY.